May 14, 1963 E. J. CAMFIELD ET AL 3,089,985

SAFETY CIRCUIT

Filed Oct. 27, 1960

INVENTORS
E. J. CAMFIELD
W. E. HAUSCHILD
BY [signature]
ATTORNEY

United States Patent Office 3,089,985
Patented May 14, 1963

3,089,985
SAFETY CIRCUIT

Eugene J. Camfield and William E. Hauschild, Indianapolis, Ind., assignors to Western Electric Company, Incorporated, New York, N.Y., a corporation of New York Filed Oct. 27, 1960, Ser. No. 65,463
4 Claims. (Cl. 317—135)

This invention relates to electrical circuitry for actuating a load device only upon substantially simultaneous actuation of two manually operable switches, whereby the load device is operable only, for example, when the operator's hands are safely removed from a danger zone. It is an object of the invention to provide improved electrical circuitry of this character.

Prior art circuitry serving the basic function of preventing operation of a load device, such as a punch press or molding machine, except when two manually operable switches are operated concurrently, has had various disadvantageous characteristics whereby it has been less than fully satisfactory as safety means. Such prior art circuitry has in various instances permitted the jamming of one switch in its actuated position such that only the remaining switch must be manually operated to effect operation of the machine. If the circuitry permits such jamming of one switch, it is ineffective as a safety circuit. Other prior art circuitry has been unsatisfactory because it falls short of being fully safe for other reasons, because of a lack of reliability, and/or because of requiring expensive circuit components.

Circuitry which is in accordance with the present invention employs an inexpensive form of time delay relay in each of the two control circuits containing the two manually operable switches, the time delay relay in each of the two control circuits being adapted, a prescribed period of time after initiation thereof, to prevent completion of the other control circuit, but being ineffective to open the other control circuit after it has been actuated by virtue of a lock-in circuit. Accordingly, both control circuits can be actuated only if both manually operable switches are operated prior to the effective operation of either time delay relay, but, when thus actuated, both control circuits are independent of subsequent operation of the time delay relays. Both control circuits must be actuated to complete the load circuit, that is, to actuate the load device.

Accordingly, it is another object of the invention to provide improved electrical circuitry of the character described above which prevents actuation of a load device after one of two manually operable switches has been jammed in its actuated position.

It is a further object of the invention to provide improved electrical circuitry of the character described above which fails safe upon failure of applied electrical power.

It is still another object of the invention to provide improved electrical circuitry of the character described above which employs conventional and inexpensive components and which is efficient and reliable in operation.

Other objects and advantages of the invention will become apparent by reference to the following description and the accompanying drawings illustrating a preferred embodiment thereof, in which—

Figure 1:
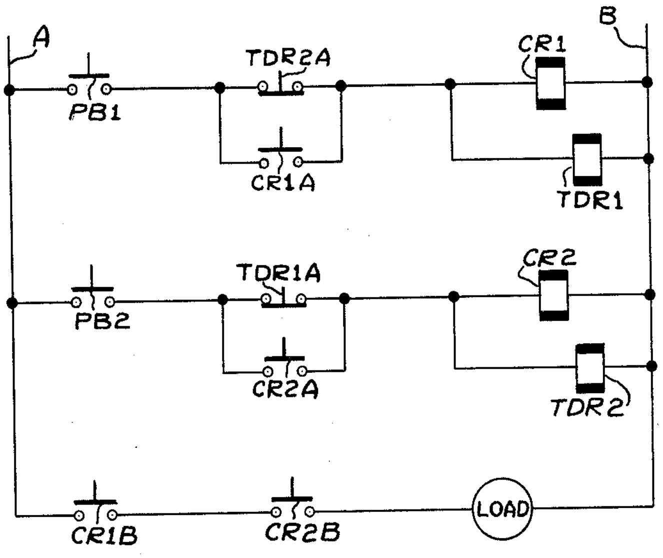
Figure 2:
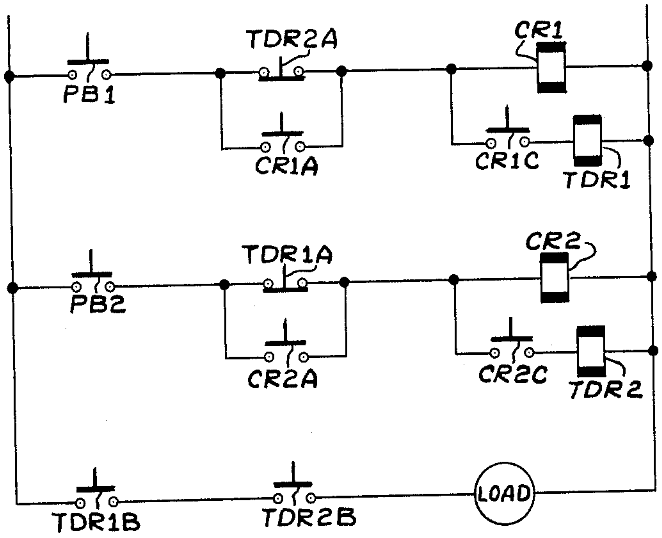

FIG. 1 is a circuit diagram illustrating the preferred embodiment of the invention, and FIG. 2 is a similar circuit diagram illustrating another embodiment of the invention.

As indicated above, electrical circuitry incorporating the present invention is particularly applicable to machines whose operation comprises a hazard to the operator, particularly in that one of the operator's hands might be hurt. The provision of such electrical circuitry as herein described requires that the operator's hands be substantially removed from the danger zone before operation of the machine can be effected. Conventionally, such circuitry employs push buttons such as those designated PB1 and PB2 in FIG. 1. It will be understood by those skilled in the art that these push buttons are arranged at a substantial distance from the danger zone of a machine and are sufficiently spaced from each other that they cannot be operated by one hand. This being the case, the operator's hands must, at one time, be removed from the danger zone in order to actuate the two push buttons. However, it is also essential that the electrical circuitry require substantially simultaneous operation of the two push buttons since the operator might otherwise depress one push button and then move one hand into the danger zone before he depresses the other push button. More commonly, an operator will jam one switch closed so that he may operate the machine by depression of the remaining push button. The circuitry illustrated in FIG. 1 prevents machine operation under these circumstances and thereby eliminates the danger of injury to the operator from these causes.

It may be seen that push button PB1 controls the flow of current between two electric powerlines A and B to a conventional control relay CR1 and a time delay relay TDR1. The other push button PB2 controls the flow of current through a conventional relay CR2 and a time delay relay TDR2. The connection between the push button PB1 and relays CR1 and TDR1 is normally completed by contacts TDR2A which are normally closed contacts of the time delay relay TDR2 of the second control circuit. It will be appreciated, therefore, that if the push button PB2 is closed substantially ahead of the push button PB1, such that the time delay relay TDR2 reaches its fully actuated condition before the push button PB1 is depressed, the contacts TDR2A will have opened the first control circuit such that closure of the push button PB1 will not cause energization of the relays CR1 and TDR1. Similar normally closed contacts TDR1A, of the time delay relay TDR1 of the first control circuit, are arranged in the second control circuit. Accordingly, if the push button PB1 is depressed substantially ahead of the push button PB2, the contacts TDR1A will have opened the second control circuit such that the depression of the push button PB2 will not effect energization of the relays CR2 and TDR2.

Returning again to the first control circuit, contacts CR1A are arranged in a bypass circuit around the contacts TDR2A. The former are normally open contacts of the conventional relay CR1. With this addition to the first control circuit, it will be seen that after the relay CR1 has been actuated, the resulting closure of the contacts CR1A bypasses the contacts TDR2A. Accordingly, when the time delay relay TDR2 of the second control circuit reaches its actuated position, the opening of its contacts TDR2A in the first control circuit will have no effect on the first control circuit.

Similarly, normally open contacts CR2A of the relay CR2 are arranged in a bypass circuit around the contacts TDR1A of the second circuit. Accordingly, actuation of the relay TDR1 of the first circuit after actuation of the conventional relay CR2 of the second circuit does not open the second circuit.

The lower circuit of FIG. 1 is the power or load circuit, current being allowed to pass through the indicated load device when both of two switches CR1B and CR2B are closed concurrently. These last-mentioned switches are normally open contacts, respectively, of the relay CR1 and the relay CR2. It will be noted that both of the two control circuits must be energized before the load can be energized.

The circuitry of FIG. 1 now having been described, it is believed that a full understanding of the invention will best be obtained following consideration of both improper and proper operation of the circuitry. Let it be assumed first that the time delay relays TDR1 and TDR2 require approximately one-quarter second to reverse their contacts following initial energization. Let it now be assumed that the operator depresses PB1 approximately one-half second before he depresses the push button PB2. Immediately upon depression of the push button PB1, the relay CR1 is actuated and closes the contacts CR1A in the first control circuit and the contacts CR1B in the power circuit. The time delay relay TDR1 of the first control circuit will also be energized immediately, and after one-quarter second will have actuated its contacts TDR1A of the second control circuit. Since the push button PB2 has not yet been closed to energize the relay CR2 and close the relay contacts CR2A, the latter are open. With both the contacts TDR1A and the contacts CR2A open, the subsequent depression and closure of the push button PB2 is ineffective. Since the relay CR2 cannot be operated, the relay contacts CR2B in the power circuit cannot be closed and, therefore, the load cannot be energized.

Similarly, depression of the push button PB2 one-half second before depression of the push button PB1 will permit actuation of the time delay relay TDR2 and opening of the relay contacts TDR2A in the first control circuit such that the subsequent depression and closure of the push button PB1 is ineffective. Since the relay CR1 cannot be energized and the relay contacts CR1B in the power circuit cannot be closed, the load device cannot be energized.

Since energization of the load device is dependent upon actuation of the two push buttons PB1 and PB2 substantially simultaneously, that is, within a time period of approximately one-quarter second, it will be appreciated that the operator cannot effect operation of the load device if he jams one of the push buttons in its actuated or closed position by means of a wedge, prop or weight.

In a proper operation of the circuitry, the two push buttons are depressed within a time period of approximately one-quarter second. Let it be assumed that the push button PB1 is depressed first and that the push button PB2 is depressed one-eighth second after the depression of the push button PB1. The relay CR1 will be actuated first and will close its contacts CR1A and CR1B. The time relay relay TDR1 will also be energized but it will not actuate its contacts TDR1A until after the lapse of one-quarter second. After the lapse of only one-eighth second, the push button PB2 is depressed in accordance with our assumption. The relay CR2 is immediately actuated and closes its contacts CR2A and CR2B. When the time delay relay TDR1 subsequently reaches its actuated condition, the opening of its contacts TDR1A is ineffective to open the second control circuit since those contacts have already been bypassed by the relay contacts CR2A. Still later, when the time delay relay TDR2 reaches its actuated condition, the opening of its contacts TDR2A is ineffective to open the first control circuit since the relay contacts CR1A have already closed the bypassing circuit around the associated time delay relay contacts TDR2A.

During this sequence of operation, the load became energized upon the closing of relay contacts CR2B, the relay contacts CR1B having closed shortly before.

In the circuitry of FIG. 1, it should be noted that only four relays are required. Two of these are conventional relays which operate substantially instantaneously although it is not necessary that these relays be chosen to operate at unusually high speed. It is necessary only that these relays operate substantially faster than the time delay relays. The other two required relays, namely, the two time delay relays, may be of commercial, economical and readily available form. They need not be adjustable, and preferably are not adjustable, since the operator might adjust an adjustable relay such that its prolonged time period would render the circuitry ineffective as a safety measure.

In addition, the contacts required on the relays are simple in form and small in number. More particularly, the time delay relays each require only a single normally closed set of contacts. The conventional relays CR1 and CR2 each require two sets of normally open contacts.

The embodiment of the invention illustrated in FIG. 2 employs substantially the same components in substantially the same arrangement and accordingly are designated by the same reference characters. Only two relatively minor changes are made over the circuitry of FIG. 1, and accordingly only those changes are described herein.

It will be noted first that the power circuit at the bottom of the diagram employs normally open contacts TDR1B and TDR2B of the time delay relays TDR1 and TDR2. This is a modification over the power circuit of FIG. 1 in which the contacts are normally open contacts of the conventional relays CR1 and CR2. The use of time delay relay contacts instead of conventional relay contacts to control the load device makes little difference except as to the rapidity of response of the circuitry. The circuitry of FIG. 1 will, of course, produce a more rapid response and may therefore be preferred in some instances.

The other change involves the use of normally open contacts CR1C of the relay CR1 in series with the time delay relay TDR1, and normally open contacts CR2C of the relay CR2 in series with the time delay relay TDR2. As will be apparent to those skilled in the art, the effect of placing these normally opened contacts of the conventional relays in series with the corresponding time delay relays is to delay initial energization of the time delay relays until such time as the associated conventional relay has been actuated. The two associated relays CR1 and TDR1, for example, operate in sequence, the time delay relay being initially energized only after the conventional relay has been actuated. This arrangement provides for a permissible time delay between depression of the two push buttons which is equal to the delay period of the time delay relays. As opposed to this, the permissible time delay in the operation of the two push buttons in the circuitry of FIG. 1 is equal to the delay period of the time delay relays minus the operation time of the conventional relays.

It should be noted that in circuitry in accordance with the present invention, the two control circuits, each containing one of the manually operable switches, condition each other against actuation but only following the lapse of a predetermined period of time dictated by the time delay relay incorporated in each control circuit. In addition, each control circuit is ineffective to open the other control circuit if the other control circuit has become energized prior to the lapse of the prescribed time interval.

It will be apparent that circuitry in accordance with the present invention effectively prevents jamming of either manually operable switch and attendant loss of the safety factor. It should be noted also that loss of power to any of the three branches of the circuitry in either of the illustrated embodiments of the invention causes the circuitry to fail safe. That is, such power failure will result not in operation of the load device but in inability to operate the load device. It will also be appreciated by those skilled in the art that only conventional, economical and readily available relays are called for by the circuitry, and that the circuitry is inherently efficient and reliable in operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Electrical circuitry for actuating a load device only upon substantially simultaneous actuation of two manually operable switches, comprising two control circuits and an associated output circuit, each of said control circuits including a control relay and a time delay relay arranged in parallel, and a normally open, manually closable switch arranged in series with said relays, each of said time delay relays having normally closed switch contacts arranged in series with the manually operable switch and the relays of the other control circuit, whereby each time delay relay, a prescribed period of time after closing of the associated manually operable switch, may prevent completion of the other control circuit, each of said control relays having normally open switch contacts arranged, when closed, to bypass said time delay relay switch contacts of its own control circuit, whereby actuation of one of said time delay relays may not open the other control circuit after actuation of the control relay thereof, said output circuit including, in series arrangement, a load device and two normally open switches, each of said switches being associated with one of said control circuits and being closable by actuation of one of the relays thereof.

2. Electrical circuitry for actuating a load device only upon substantially simultaneous actuation of two manually operable switches, comprising two control circuits and an associated output circuit, each of said control circuits including a control relay and a time delay relay arranged in parallel, and a normally open, manually closable switch arranged in series with said relays, each of said time delay relays having normally closed switch contacts arranged in series with the manually operable switch and the relays of the other control circuit, whereby each time delay relay, a prescribed period of time after closing of the associated manually operable switch, may prevent completion of the other control circuit, each of said control relays having normally open switch contacts arranged, when closed, to bypass said time delay relay switch contacts of its own control circuit, whereby actuation of one of said time delay relays may not open the other control circuit after actuation of the control relay thereof, each of said control relays also having normally open switch contacts in series with the associated time delay relay, whereby actuation of the time delay relays may not begin until after the associated control relay has been actuated, said output circuit including in series arrangement, a load device and two normally open switches each associated with one of said control circuits and closable by actuation of one of the relays thereof.

3. Electrical circuitry as specified in claim 1 wherein said normally open switches in said load circuit are closable by actuation of respective ones of said control relays.

4. Electrical circuitry as specified in claim 2 wherein said normally open switches in said load circuit are closable by actuation of respective ones of said control relays.

References Cited in the file of this patent

UNITED STATES PATENTS 2,753,493 Saives ---------------- July 3, 1956